United States Patent [19]

Furuta et al.

[11] Patent Number: 5,071,912
[45] Date of Patent: Dec. 10, 1991

[54] THERMOPLASTIC RESIN COMPOSITION
[75] Inventors: Motonobu Furuta, Tsukuba; Takashi Maruyama, Kobe, both of Japan
[73] Assignee: Sumitomo Chemical Co., Ltd., Osaka, Japan
[21] Appl. No.: 478,404
[22] Filed: Feb. 12, 1990
[51] Int. Cl.$^5$ .................... C08L 51/06; C08L 53/00; C08L 71/12
[52] U.S. Cl. ....................................... 525/68; 525/92; 525/148; 525/152; 525/284; 525/285; 525/301; 525/316; 525/322; 525/323; 525/905
[58] Field of Search ................ 525/68, 905, 148, 152, 525/92

[56] References Cited
U.S. PATENT DOCUMENTS
4,128,602 12/1978 Katchman et al. .

FOREIGN PATENT DOCUMENTS
0142166 11/1984 European Pat. Off. .
0239347 3/1987 European Pat. Off. .
0274029 11/1987 European Pat. Off. .
0329423 2/1989 European Pat. Off. .
0352057 7/1989 European Pat. Off. .
0356194 8/1989 European Pat. Off. .
75663 7/1974 Japan .
118739 6/1985 Japan .
113049 5/1988 Japan .

Primary Examiner—Jacob Ziegler
Attorney, Agent, or Firm—Birch, Stewart, Kolasch & Birch

[57] ABSTRACT

Disclosed is a thermoplastic resin composition, comprising:
(a) a polyphenylene ether resin or a resin composition containing a polyphenylene ether,
(b) (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer, and
(c) two or more rubbery substances, at least one rubbery substance being compatible with the component (a), and at least one rubbery substance being not compatible with the component (a). The thermoplastic resin composition has good moldability and yields molded articles having well-balanced physical properties.

14 Claims, No Drawings

THERMOPLASTIC RESIN COMPOSITION

BACKGROUND OF THE INVENTION a) Field of the Invention

The present invention relates to a novel thermoplastic resin composition which can be utilized as a material for producing molded articles by injection molding, extrusion molding or a like means.

b) Related Art

Generally, polyphenylene ethers are excellent in heat resistance, hot water resistance, dimension stability, and mechanical and electrical properties. On the other hand, they have disadvantages; for example, they show unsatisfactory moldability due to their high melt viscosity, poor chemical resistance, and low impact resistance.

Known methods for improving moldability by lowering the melt viscosity of polyphenylene ethers while maintaining their excellent properties include use of a mixture of a polyphenylene ether and a polystyrene resin. However, these known methods still fail to improve chemical resistance.

On the other hand, propylene polymers are not only excellent in various properties such as moldability, toughness, water resistance, chemical resistance, etc., but also they have low specific gravity and are cheap in cost; they have been widely used as a material for preparing various molded articles, films, sheets, etc.

However, the propylene polymers have defects or points which need to be improved in heat resistance, rigidity, impact resistance, coatability, adhesiveness, etc., which creates an obstacle in developing new practical utility. In particular, improvement in the heat resistance and impact resistance thereof is strongly desired.

Naturally, it may be expected to blend a polyphenylene ether and a propylene polymer to prepare a resin composition which could have the advantages of the both polymers and which could have improved moldability and impact resistance, and thus a wide possibility of new application would be available.

Blending a polyphenylene with a propylene polymer, however, actually gives rise to a resin composition in which compatibility of both polymers is poor so that molded articles obtained from such a blend as by injection molding, suffers phase separation between the polyphenylene ether and the propylene polymer, thereby providing articles having an extremely poor appearance and poor mechanical properties, which are unsatisfactory for practical purposes. However, there has been a strong demand for a composition of polyphenylene ether having high impact resistance and good weatherability while maintaining its inherent heat resistance.

A method for improving the compatibility between a polyphenylene ether and a propylene polymer is known, as described in Unexamined Japanese Pantent Publication No. 207349/1989, in which method a polyphenylene ether is blended with a propylene polymer modified with a styrene based monomer by graft copolymerization.

On the other hand, it is known as a method for improving impact strength that a rubbery substance is blended with and is dispersed in a polyphenylene ether.

The rubbery substance has to be dispersed uniformly in the polyphenylene ether resin so as to obtain a composition having high impact strength.

However, where the rubbery substance is blended with a composition comprising a polyphenylene ether and a modified propylene polymer grafted with a styrene-based monomer, or blended with a composition comprising a polyphenylene ether and a composition containing the modified propylene polymer and a propylene polymer, large portion of the rubbery substance is inclined to disperse in the polyphenylene ether or in the modified propylene polymer, and thus this method fails to provide a composition having high impact resistance.

In view of the above points, the present inventors have studied intensively and extensively in order to develop effective technology which lends itself to the improvement of a resin composition composed of a polyphenylene ether, propylene polymer and rubbery substance.

As the result, they have found that a new resin composition having its impact resistance greatly improved is obtained by using as its rubbery substance, two or more rubbery substances, with at least one of the substances being compatible with a polyphenylene ether or a composition containing the polyphenylene ether, and with at least one of the substances being not compatible with a polyphenylene ether or a composition containing the polyphenylene ether. This finding led to the present invention.

SUMMARY OF THE INVENTION

Therefore, the present invention provides a thermoplastic resin composition having excellent heat resistance, processability, chemical resistance and impact resistance, comprising:

(a) a polyphenylene ether resin or a resin composition containing a polyphenylene ether, (b) (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer, and (c) two or more rubbery substances, at least one rubbery substance being compatible with the component (a) and at least one rubbery substance being not compatible with the component (a)

DETAILED DESCRIPTION OF THE INVENTION

The polyphenylene ether used in the present invention as the component (a) is a polymer obtainable by oxidative polymerization of at least one phenol compound represented by the general formula (1)

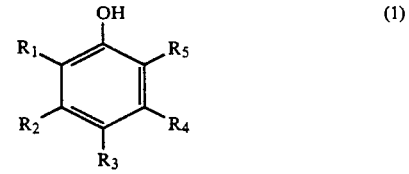

wherein $R_1$, $R_2$, $R_3$, $R_4$ and $R_5$, each independently represents a hydrogen atom, a halogen atom, a hydrocarbon group or a substituted hydrocarbon group, or a hydrocarbyloxy group or a substituted hydrocarbyloxy group, provided that at least one of $R_1$, $R_2$, $R_3$, $R_4$ and $R_5$ is a hydrogen atom, with oxygen or an oxygen-containing gas using an oxidative coupling catalyst.

Concrete examples of the groups represented by $R_1$, $R_2$, $R_3$, $R_4$ and $R_5$ include a hydrogen atoms, chlorine, bromine, fluorine, iodine, a methyl group, an ethyl group, an n- or iso-propyl group, a pri-, sec- or tert-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, an allyl group, etc.

Concrete examples of the compounds represented by the general formula (I) include phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-tert-butylphenol, thymol, 2-methyl-6-allylphenol, etc.

In addition, there may be used phenol compounds which are outside the scope of the general formula (1), for example, those obtainable by copolymerizing a polyhydroxy aromatic compound such as bisphenol A, tetrabromobisphenol A, resorcinol, hydroquinone, novolak resin, etc. with one of the compounds represented by the general formula (I).

Of the above-described phenol compounds, preferred examples include homopolymers of 2,6-dimethylphenol or 2,6-diphenylphenol, or copolymers of a large amount of 2,6-dimethylphenol and a small amount of 3-methyl-6-tertbutylphenol or 2,3,6-trimethylphenol.

The oxidative coupling catalyst which can be used in the oxidative polymerization of the phenol compounds is not limited particularly but any catalyst can be used that can catalyze such a polymerization reaction.

Representative examples thereof include catalysts comprising a copper (I) salt and a tertiary amine such as copper (I) chloride-triethylamine and copper (I) chloridepyridine; catalysts comprising a copper (II) salt, an amine and an alkali metal hydroxide such as copper (II) chloride-pyridine-potassium hydroxide; catalysts comprising a manganese salt and a primary amine such as manganese chloride-ethanolamine and manganese acetate-ethylenediamine; catalysts comprising a manganese salt and an alcoholate or phenolate such as manganese chloride-sodium methylate and manganese chloride-sodium phenolate; catalysts comprising a cobalt salt and a tertiary amine, and the like.

It is known that the physical properties and the like of polyphenylene ethers vary depending on the reaction temperature of oxidative polymerization to obtain the polymer, i.e., high temperature polymerization, which is performed at temperatures higher than 40° C., and low temperature polymerization, which is carried out at temperatures not higher than 40° C., result in the production of polyphenylene ethers with different physical properties. In the present invention, both the high and low temperature polymerization reactions can be used.

The polyphenylene ethers which can be used in the present invention as the component (a) also includes, modified products obtained by grafting the above-mentioned polymer or copolymer with another polymer.

For example, the modified polymers include those obtained by oxidative polymerization of the phenol compound of the general formula (I)

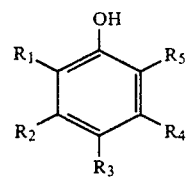

wherein $R_1$, $R_2$, $R_3$, $R_4$ and $R_5$ have the same meaning as defined above, in the presence of an ethylene-propylene-polyene terpolymer, those obtained by oxidative polymerization of the phenol compound of the general formula (1)

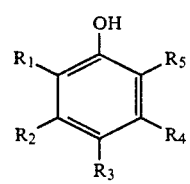

wherein $R_1$, $R_2$, $R_3$, $R_4$ and $R_5$ have the same meaning as defined above, in the presence of a polystyrene, those obtained by subjecting one or more styrene monomers and/or other copolymerizable monomers to organic peroxide graft polymerization in the presence of a polyphenylene ether as described in, for example, Japanese Patent Publication Nos. 47862/1972, 12197/1973, 5623/1974, 38596/1977 and 30991/1977, and those obtained by melt-kneading the polyphenylene ether together with the polystyrene based polymer and a radical generating agent (e.g., peroxide) as described in, for example, Unexamined Japanese Patent Publication No. 142799/1977.

The resin composition containing the polyphenylene ether as the component (a) used in the present invention is a resin composition comprising the polyphenylene ether above described and one or more other high molecular weight compounds.

Examples of the other high molecular weight compounds include polyolefins such as polymethylpentene; homopolymers and copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer, and alkenyl aromatic resins; polycarbonate, polysulfone, polyethylene terephthalate, polybutylene terephthalate, polyarylene esters (e.g., U polymer produced by Unitika Co.), polyphenylene sulfide; polyamides such as Nylon-6, Nylon-6,6, Nylon-12, etc.; condensed high molecular weight compounds such as polyacetals, etc. Furthermore, various thermosetting resins can be used, examples of which include silicone resins, fluorinated resins, polyimides, polyamideimides, phenol resins, alkyl resins, unsaturated polyester resins, epoxy resins, diallylphthalate resins, etc.

The proportion at which the polyphenylene ether and the other high molecular weight compound are mixed with each other can be varied widely, for example, in the range of 1 to 99% by weight of the polyphenylene ether and 99 to 1% by weight of the other high molecular weight compound. Within this range, optimal composition can be selected depending on the object and desired application.

The component (b) used in the present invention is (i) a modified propylene polymer obtainable by grafting a propylene polymer with a styrene-based monomer or a mixture of a styrene-based monomer and a monomer copolymerizable with the styrene-based monomer or (ii) a composition containing said modified propylene polymer and a propylene polymer.

By the term "modified propylene polymer" is meant a copolymer comprising 100 parts by weight of propylene polymer and 0.2 to 150 parts by weight, preferably 2 to 90 parts by weight, more preferably 3 to 70 parts by weight of a styrene-based monomer or a mixture of a styrene-based monomer and a monomer copolymerizable with the styrene-based monomer which is obtained by graft copolymerization.

When the amount of the monomer to be graft-polymerized is smaller than 0.2 part by weight, the effect of modification of resins is not observed. On the other hand, the chemical resistance of the resin is deteriorated when the amount of the monomer to be graft-polymerized is larger than 150 parts by weight.

The propylene polymer (inclusive of the raw polymer to be modified) used in the component (b) of the present invention is a propylene homopolymer or a propylene copolymer. By the term "propylene copolymer" is meant a random or block copolymer of propylene and an α-olefin having 2 to 18 carbon atoms.

Specific examples of the propylene copolymer include ethylene-propylene copolymer, propylene-butene-1 copolymer, propylene-hexene-1 copolymer, propylene-4-methylpentene-1 copolymer, and propylene-octene-1 copolymer.

The propylene polymer may be the propylene homopolymer or the propylene copolymer alone, or it may be a mixture of one or more of them. Furthermore, the propylene polymer may be blended with an ethylene-α-olefin copolymer, if desired or necessary.

As for the ethylene-α-olefin copolymer blended with the propylene polymer, there can be preferably used ones which have a density of 0.82 to 0.92 g/cm³.

In the present invention, highly crystalline propylene polymer may be used as the propylene polymer in the component (b), if desired.

By the term "highly crystalline propylene polymer" is meant a propylene homopolymer or block copolymer which has an isotactic pentad fraction of 0.970 or higher, defined as an isotactic pentad fraction in the boiling heptane-insoluble portion of the propylene homopolymer or of a propylene homopolymer portion of the propylene block copolymer that is the first segment polymerized in the first step of propylene homopolymer or block copolymer formation, or a propylene polymer which has an isotactic pentad fraction defined as above of 0.970 or higher and a content of a heptane-soluble portion of 5.0% by weight or less and a content of a 20° C. xylene-soluble portion of 2.0% by weight or less.

The above-described type of highly crystalline propylene polymers can be prepared by methods described in, for example, Unexamined Japanese Patent Publication Nos. 28405/1985, 228504/1985, 208606/1986 and 287917/1986.

For applications to fields where high rigidity is required, it is preferred to blend the propylene polymer with a nuclei generating agent. It is known that addition of, for example, aluminum or sodium salts of aromatic carboxylic acids (Unexamined Japanese Patent Publication No. 80829/1983) and aromatic carboxylic acids, metal salts of aromatic phosphoric acids or sorbitol derivatives (Japanese Patent Publication No. 12460/1980 and Unexamined Japanese Patent Publication No. 129036/1983) or the like gives rise to nuclei of crystal grains thus serving a nuclei generating agent (hereinafter, referred to as a nucleating agent).

It is also known that a polymer of vinylcycloalkane having 6 or more carbon atoms is effective as a nucleating agent (Unexamined Japanese Patent Publication No. 1738/1987).

That is, a composition which comprises the propylene polymer blended with the polymer of vinylcycloalkane polymer having 6 or more carbon atoms and which contains from 0.05 to 10,000 ppm by weight of vinylcycloalkane units in the composition has a higher crystallinity.

Furthermore, a propylene polymer having a high rigidity can be obtained by blending the propylene polymer having a high crystallinity with the vinylcycloalkane polymer.

As the propylene polymer, there can be used propylene homopolymer or propylene copolymer alone, or in the form of a mixture of two or more of them.

The styrene-based monomer in the component (b) which can be used in the modification of the propylene polymers is represented by the general formula (2)

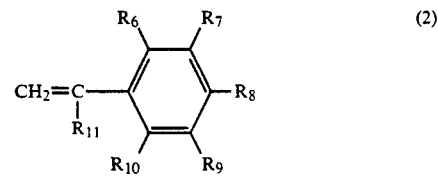

wherein $R_6$, $R_7$, $R_8$, $R_9$ and $R_{10}$, each represents a hydrogen atom, a halogen atom, an unsubstituted or substituted hydrocarbyl group, or an unsubstituted or substituted hydrocarbyloxy group, and $R_{11}$ represents a hydrogen atom, or a lower alkyl group having 1 to 4 carbon atoms.

Specific examples of $R_6$, $R_7$, $R_8$, $R_9$ and $R_{10}$ in the general formula (4) include a hydrogen atom, a halogen atom such as chlorine, bromine and iodine, a hydrocarbyl group such as a methyl group, an ethyl group, a propyl group, a vinyl group, an allyl group, a benzyl group and a methylbenzyl group, a substituted hydrocarbyl group such as a chloromethyl group and a bromomethyl group, a hydrocarbyloxy group such as a methoxy group, an ethoxy group and a phenoxy group, and a substituted hydrocarbyloxy group such as a monochloromethoxy group.

Specific examples of $R_{11}$ include a hydrogen atom and a lower alkyl group such as a methyl group and an ethyl group.

Specific examples of the styrene monomer include styrene, 2,4-dichlorostyrene, p-methoxystyrene, p-methylstyrene, p-phenylstyrene, p-divinylbenzene, p-chloromethoxystyrene, α-methylstyrene, o-methyl-α-methylstyrene, m-methyl-α-methylstyrene, p-methyl-α-methylstyrene and p-methoxy-α-methylstyrene. They may be used alone or in admixture. Of these, styrene is preferred.

As for the modified propylene polymer of the component (b) in the present invention, there can be used a modified propylene polymer obtained by graft copolymerizing the styrene based monomer with one or more other monomers copolymerizable therewith.

Thermoplastic resins having high mechanical properties can be obtained by appropriately selecting monomers with the styrene based monomer, and incorporating them by graft copolymerizing with the propylene polymer.

Specific examples of the monomer copolymerizable with the styrene-based monomer include acrylonitrile, methacrylonitrile, fumaric acid, maleic acid, vinyl ketone, maleic anhydride, acrylic acid, methacrylic acid, vinylidene chloride, maleate ester, methyl methacrylate, ethyl methacrylate, propyl methacrylate, butyl methacrylate, methyl acrylate, ethyl acrylate, propyl acrylate, butyl acrylate, vinyl chloride, vinyl acetate, divinyl benzene, ethylene oxide, isobutene, alkyl vinyl ether, anetholle, indene, coumarone, benzofuran, 1,2-dihydronaphthalene, acenaphthylene, isoprene, chloroprene, trioxane, 1,3-dioxolane, propylene oxide, β-propiolactone, vinyl biphenyl, 1,1-diphenyl-ethylene, 1-vinylnaphthalene, 2-vinylnaphthalene, 2-vinyl-pyridine, 4-vinylpyridine, 2,3-dimethylbutadiene, ethylene, propylene, allyltrimethylsilane, 3-butenyl-trimethylsilane, vinyl carbazone, N,N-diphenylacrylamide, and fumarnitrile. Derivatives of these monomers can also be used. They may be used alone or in combination with one another. Preferable among them are maleic anhydride, methyl methacrylate, acrylonitrile, etc.

The amount of the styrene-based monomer in the mixture of the styrene-based monomer and the monomer copolymerizable with the styrene-based monomer may vary in the range of 1 to 100 wt %, depending on the intended use of the resin composition.

In the present invention, there is no particular limitation on the methods of preparing the modified propylene polymer by grafting a propylene polymer with a styrene-based monomer, or a mixture of a styrene-based monomer and a monomer copolymerizable with the styrene-based monomer, and ordinary known methods such as suspension polymerization methods, emulsion polymerization methods, solution polymerization methods and bulk polymerization methods (inclusive of methods using not only polymerization vessels but extruders) can be used for the purpose.

For example, the grafting of a propylene polymer with a styrene monomer and an acrylonitrile may be accomplished as follows. First, a copolymer is prepared from the styrene monomer and the acrylonitrile by anionic polymerization. Secondly, the copolymer is melt-mixed with a propylene polymer and a peroxide to give a modified propylene polymer.

Alternatively, a propylene polymer may be copolymerized with a styrene monomer and glycidyl methacrylate by radical polymerization.

The peroxide used to prepare the modified propylene polymer is not specifically limited; it may be selected from the following organic peroxides. 2,2'-azobisisobutyronitrile, 2,2'-azobis(2,4,4-trimethylvaleronitrile), methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxy isobutyrate, t-butyloxy pivalate, t-butyloxy-2-ethylhexanoate, t-butylperoxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleic acid, t-butyl peroxyisopropyl carbonate, and polystyrene peroxide.

Component (b) in the resin composition of the present invention is (i) a propylene polymer modified with the above-mentioned styrene monomer or a mixture of the styrene monomer and a monomer copolymerizable with the styrene monomer, or (ii) a composition containing said modified propylene polymer and a propylene polymer.

If necessary, the component (b) in the thermoplastic resin composition of the present invention may be incorporated with a variety of additives such as antioxidant, heat stabilizer, light stabilizer, antistatic agent, inorganic and organic colorant, corrosion inhibitor, crosslinking agent, blowing agent, slip agent, plasticizer, fluorescent agent, surface smoothing agent, and surface brightener.

In the thermoplastic resin composition of the present invention, two or more rubbery substances, at least one being compatible with the component (a) and at least one being not compatible with the component (a) are used as component (c).

More particularly, at least two rubbery substances are used as component (c), that is, at least one rubbery substance (hereinafter, referred to as c-1) is compatible with the component (a) and have at least one alkenyl aromatic chain in the same molecule, and at least one rubbery substance (hereinafter, referred to as c-2) is not compatible with the component (a) and does not have alkenyl aromatic chain in the same molecule.

The "rubbery substance" used herein refers to any natural and synthetic polymeric material which is elastic at room temperature.

Of the rubbery substance used in the present invention as the component (c), specific examples of the rubbery substance )c-1) which are compatible with the polyphenylene ether as component (a) include butadiene-styrene copolymers inclusive of random copolymers such as SBR rubber, block copolymers such as SBS rubber, and graft copolymers, etc.) or their hydrogenated products (e.g. SEBS), styrene-isoprene copolymers (SI) or their hydrogenated products (SEP), styrene-butylene copolymers, styrene-ethylene-propylene copolymers, ethylene-propylene-styrene copolymers, etc.

Furthermore, styrene-modified products of natural or synthetic polymer materials which are elastic at room temperature, are used as the rubbery substance (c-1). Of these, a butadiene-styrene copolymer, a styrene-modified ethylene-propylene copolymer, etc., can preferably be used.

These rubbery substances (c-1) which are compatible with a polyphenylene ether can be used alone, or in the form of a mixture of two or more of them.

On the other hand, specific examples of the rubbery substance (c-2) which are not compatible with a polyphenylene ether as component (a) include natural rubber, butadiene polymer, isoprene polymer, chlorobutadiene polymer, butadiene-acrylonitrile copolymer, isobutylene polymer, isobutylene-butadiene copolymer, isobutylene-isoprene copolymer, ethylene-propylene copolymer, ethylene-butene copolymer, perfluororubber, fluororubber, chloroprene rubber, butyl rubber, silicone rubber, ethylene-propylene-nonconjugated diene copolymer, thiokol rubber, polysulfide rubber, polyurethane rubber, polyether rubber (such as polypropylene oxide), epichlorohydrin rubber, polyester elastomer, polyamide elastomer, and epoxy group-containing copolymer.

The "epoxy group-containing polymer" used herein refers to a copolymer composed of an unsaturated epoxy compound and an ethylenically unsaturated compound.

The epoxy group-containing polymer is not specifically limited in its composition; but it should preferably contain an unsaturated epoxy compound in an amount of 0.1–50 wt %, more preferably 1–30 wt %.

The unsaturated epoxy compound is a compound which has in the molecule an epoxy group and an unsaturated group copolymerizable with an ethylenically unsaturated compound.

Examples of the unsaturated epoxy compound are unsaturated glycidyl esters and unsaturated glycidyl ethers represented by the general formulas (3) and (4) below, respectively,;

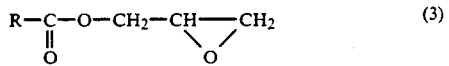

wherein R represents a $C_{2-18}$ hydrocarbyl group having an ethylenically unsaturated bond.

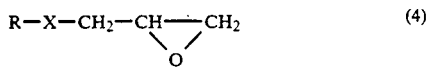

wherein R represents a $C_{2-18}$ hydrocarbyl group having an ethylenically unsaturated bond, and X is a group represented by $-CH_2-O-$ or

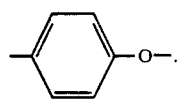

Among the above examples of rubbery substances (c-2) not compatible with the component (a), it is preferable to use a rubbery substance which is compatible with a modified propylene polymer of the component (c).

Examples of the modified propylene polymer include an ethylene-α-olefin copolymer rubber such as an ethylene-propylene copolymer and an ethylene-α-olefin-nonconjugated diene copolymer rubber such as a ethylene-propylene-nonconjugated copolymer.

As for the ethylene-α-olefin copolymer rubber it is preferable to use copolymer rubbers of ethylene and another α-olefin such as propylene, butene-1, pentene-1, hexene-1, 4-methylpentene-1 and octene-1, or ternary copolymer rubbers such as ethylene propylene-butene-1 copolymer. Of these, ethylene-propylene copolymer rubber is preferred.

The ethylene content of the ethylene-α-olefin copolymer rubber is 15 to 85% by weight, preferably 40 to 80% by weight. The highly crystalline copolymer having an ethylene content of more than 85% by weight is difficult to process under ordinary rubber molding conditions while that having an ethylene content of less than 15% by weight tends to suffer from having an increase in its glass transition point (Tg), resulting in the deterioration of rubbery properties, which is not desirable. It is preferred that the ethylene-α-olefin copolymer rubber has a glass transition point of not higher than $-10°$ C.

The Mooney viscosity ($ML_{1+4}$, 121° C.) of the copolymer rubber is preferably 5 to 120.

These rubbery substances (c-2) which are not compatible with a polyphenylene ether can be used alone, or in the form of a mixture of two or more of them.

The rubbery substance used in the present invention as the component (c) may be produced by any process (e.g., emulsion polymerization and solution polymerization) using any catalyst (e.g., peroxide, trialkyl aluminum, lithium halide, and nickel-based catalyst).

Moreover, the rubbery substance may have a varied degree of crosslinking, a varied ratio of microstructure (e.g., cis-structure, trans-structure, and vinyl group), and a varied average rubber particle diameter.

In addition, the above-mentioned copolymer as the rubbery substance may be in the form of a random copolymer, block copolymer, or graft copolymer. These copolymers may also be used in a modified form. Examples of the modifier include maleic anhydride, glycidyl methacrylate and carboxylic acid-containing compounds. They may be used alone or in combination with one another.

In the component (c) of the present invention, the ratio of the rubbery substance (c-1) compatible with the component (a) to the rubbery substance (c-2) not compatible with the component (a) may be 1–99 wt % to 99–1 wt %, preferably 5–95 wt % to 95–5 wt %.

With the rubbery substance (c-1) less than 1 wt % or more than 99 wt %, the improvement of impact strength is poor.

The rubbery substance as the component (c) can be used in an amount of 1 to 50 parts by weight per 100 parts by weight of the sum of the components (a) and (b).

When the rubbery substance is contained in an amount of less than 1 part by weight, the improvement of impact resistance by the addition of the rubbery substance is poor. On the other hand, with the rubbery substance in an amount of exceeding 50 parts by weight, the excellent properties which polyphenylene ether has inherently are weakened, which is not desirable.

In practicing the present invention, the thermoplastic resin composition may be kneaded together with a reinforcing agent such as glass fiber or carbon fiber, an inorganic or organic filler such as carbon black, silica or $TiO_2$, a plasticizer, a stabilizer, a flame retardant, a dye, a pigment, etc.

More particularly, the reinforcing agent is to increase mechanical and thermal properties such as bending strength, flexural modulus, tensile strength, modulus in tension, and heat distortion temperature when it is admixed. Examples thereof include alumina fiber, carbon fiber, glass fiber, high modulus polyamide fiber, high modulus polyester fiber, silicon carbide fiber, titanate whisker, etc.

As for the amount of the reinforcing agent, it is sufficient that the reinforcing agent is contained in amounts effective for reinforcing the thermoplastic resin composition and usually it is preferred to use about 5 to 100 parts by weight of the reinforcing agent per 100 parts by weight of the resin composition of the present invention.

Particularly preferred reinforcing filler is glass, and it is preferred to use glass fiber filament composed of borosilicate glass containing a relatively small amount of sodium, which is made of gypsum and aluminium borosilicate. This glass is known as "Σ" glass. However, in the case where electric properties are not so important, other glass such as the one known as "C" glass, which contains sodium in small amounts, is also useful. The glass fiber filament can be produced by conventional methods, for example, steam or air blowing, flame blowing, and mechanical drawing. Filaments suitable for reinforcing plastics can be produced by mechanical drawing. The diameter of the filament ranges from about 2 to 20 μm, which is not so strict in the present invention.

In the present invention, the length and form of the glass fiber filament are not limited particularly. The filaments may be stranded into multifilament fibers, which may then be stranded into threads, ropes or rovings. The filaments may also be woven to obtain mats. However, it is convenient to use glass filaments cut in the form of strands about 0.3 to about 3 cm, preferably about 0.6 cm or less, in length.

To be in detail on the flame ,retardant, those flame retardants which are useful in the present invention include a group of compounds well known to one skilled in the art.

Generally, the more important known compounds are compounds containing elements capable of imparting flame retardance such as bromine, chlorine, antimony, phosphor and nitrogen. For example, there can be used halogenated organic compounds, antimony oxide, a mixture of antimony oxide and a halogenated organic compound, a mixture of antimony oxide and a phosphor compound, a phosphor element, a phosphor compound, a mixture of a phosphor compound or a compound containing a phosphor-nitrogen bond and a halogen-containing compound, and mixtures of two or more of these.

The amount of the flame retardant is not limited particularly and it is sufficient to use it in amounts affective for imparting flame retardancy. It is disadvantageous to use too large of a quantity of the flame retardant, since the physical properties of the resulting composition would be deteriorated, i.e., the softening point of the resin composition, would decrease. An appropriate amount of the flame retardant is 0.5 to 50 parts by weight, preferably 1 to 25 parts by weight, and more preferably 3 to 15 parts by weight, per 100 parts by weight of the polyphenylene ether (a) or a resin composition containing the polyphenylene ether (a).

Useful halogen-containing compounds include those represented by the general formula (5)

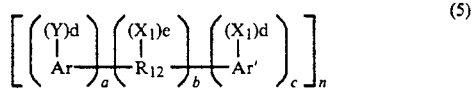

(5)

wherein n is an integer of 1 to 10, $R_{12}$ represents a member selected from the class consisting of an alkylene group, an alkylidene group or an alicyclic group (e.g., a methylene group, an ethylene group a propylene group, an isopropylene group, an isopropylidene group, a butylene group, an isobutylene group, an amylene group, a cyclohexylene group, a cyclopentylidene group, etc.), an ether group, a carbonyl group, an amine group, a sulfur-containing group (e.g, sulfide group, sulfoxide group, sulfone group, etc.), a carbonate group, and a phosphor-containing group.

$R_{12}$ may be a group which is composed of two or more alkylene or alkylidene groups bonded to each other with a group such as an aromatic group, an amino group, an ether group, an ester group, a carbonyl group, a sulfide group, a sulfoxide group, a sulfone group, or a phosphor-containing group. Ar and Ar' each are a monocyclic or polycyclic carbocyclic aromatic residue such as a phenylene group, a biphenylene group, a terphenylene group, or naphthylene.

Ar and Ar' may be the same or different.

Y represents a substituent group selected from the class consisting of an organic group, an inorganic group or an organometallic group. The substituent groups represented by Y may be (1), e.g., halogen atoms such as chlorine, bromine, iodine or fluorine, (2) an ether group represented by the general formula —OE wherein E is a monovalent hydrocarbyl group which is the same as those represented by $X_1$ below, (3) —OH group, (4) a monovalent hydrocarbyl group, or (5) other substituent groups such as a nitro group, or a cyano group. When e is 2 or more, Y's may be the same or different.

$X_1$ is a monovalent hydrocarbyl group such as an alkyl group, e.g., a methyl group, an ethyl group, a propyl group, an isopropyl group, a butyl group, a decyl group, etc., an aryl group, e.g., a phenyl group, a naphthyl group, a biphenyl group, a xylyl group, a tolyl group, etc., an aralkyl group, e.g., a benzyl group, an ethylphenyl group, etc., an alicyclic group, e.g., a cyclopentyl group, a cyclohexyl group, etc., or a monovalent hydrocarbyl group containing an inert substituent group therein. When two or more X1s are used they may be the same or different.

d is an integer of from 1 to maximum number of hydrogen atoms on the aromatic ring Ar or Ar' which hydrogen atoms can be substituted.

e is 0 or an integer of 1 to a maximum number of hydrogen atoms on $R_{12}$ which hydrogen atoms can be substituted.

a, b and c are integers inclusive of 0. When b is not 0, neither a nor c is 0. Alternatively, only one of a and c may be 0. When b is 0, the aromatic groups are bonded to each other directly through a carbon-carbon bond.

The hydroxy group or the substituent groups represented by Y one the aromatic residue Ar and Ar' may be present at any desired position(s) out of ortho-, meta- and para-positions on the aromatic ring.

Specific examples of the compound represented by the general formula (5) include the following compounds: 2,2-bis(3,5-dichlorophenyl)propane, Bis(2-chlorophenyl)methane, 1,2-bis(2,6-dichlorophenyl)ethane, 1,1-bis(4-iodophenyl)ethane, 1,1-bis(2-chloro-4-iodophenyl)ethane, 1,1-bis(2-chloro-4-methylphenyl)ethane, 1,1-bis(3,5-dichlorophenyl)ethane, 2,2-bis(3-phenyl-4-bromophenyl)ethane, 2,3-bis(4,6-dichloronaphthyl)propane, 2,2-bis(2,6-dichlorophenyl)pentane, 2,2-bis(3,5-dichlorophenyl)hexane, Bis(4-chlorophenyl)-phenylmethane, Bis(3,5-dichlorophenyl)cyclohexylmethane, Bis(3-nitro-4-bromophenyl)methane, Bis(4-hydroxy-2,6-dichloro-3-methoxyphenyl)methane, 2,2-bis(3,5-dibromo-4-hydroxyphenyl)propane, 2,2-bis(3,5-dichloro-4-hydroxyphenyl)propane, and 2,2-bis(3-bromo-4-hydroxyphenyl)propane.

In addition, there can be used bis-aromatic compounds which contain a sulfide group, a sulfoxy group, etc. in place of the two aliphatic groups contained in the above-described specific examples, for example, tetrabromobenzene, hexachlorobenzene, hexabromobenzene, 2,2'-dichlorobiphenyl, 2,4'-dibromobiphenyl, 2,4+-dichlorobiphenyl, hexabromobiphenyl, octabromobiphenyl, decabromobiphenyl, halogenated diphenyl ether containing 2 to 10 halogen atoms, oligomers composed of 2,2-bis (3,5-dibromo-4-hydroxyphenyl)propane and phosgene and having a degree of polymerization of 1 to 20, etc.

The halogen compound which is preferable as a flame retardant in the present invention includes aromatic halogenated compounds such as chlorinated benzene, brominated benzene, chlorinated biphenyl, chlorinated terphenyl, brominated biphenyl, and brominated terphenyl, compounds containing two phenyl nuclei separated by an intervening divalent alkylene group and also containing at least two chlorine or bromine atoms per one phenyl nucleus, and mixtures of two or more of the above-described compounds. Particularly preferred are hexabromobenzene, chlorinated biphenyl or terphenyl, and mixtures thereof with antimony oxide.

Representative phosphoric compounds which are suitably used as a flame retardant in the present invention include compounds represented by the general formula (6) and nitrogen containing similar compounds.

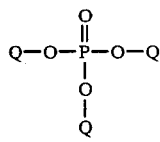

(6)

wherein Q's, which may be the same or different, each represent a hydrocarbyl group such as an alkyl group, a cycloalkyl group, an aryl group, an alkyl-substituted aryl group and an aryl-substituted alkyl group; a halogen atom; a hydrogen atom; or a combination of these. Suitable examples of the phosphoric acid esters include phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) p-tolyl phosphate, tritolyl phosphate, bis(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and diphenyl hydrogen phosphate. The most preferred phosphoric acid ester is triphenyl phosphate. It is also preferred to use triphenyl phosphate together with hexabromobenzene, or triphenyl phosphate together with antimony, oxide.

Other flame retardants which can be used in the present invention includes compounds containing a phosphor-nitrogen bond such as phosphorus nitride chloride, phosphoric ester amide, phosphoric acid amide, phosphinic acid amide, tris(aziridinyl) phosphine oxide or tetrakis(hydroxymethyl) phosphonium chloride, etc.

There is no particular limitation on the methods of preparing the resin composition of the present invention, and ordinary known methods can be used for this purpose. For example, it is effective to mix the components in the form of solutions and then evaporate the solvent or precipitate the resin in a non-solvent. On an industrial scale, however, practical method for the production uses kneading the components in a melted state. For melt-kneading, there can be used a kneading apparatus such as a single-screw extruder or a twin-screw extruder generally used, or various types of kneaders. A twin-screw extruder of high shear type is particularly preferred.

Upon kneading, it is preferred to homogeneously mix the respective resin components in the form of powder or pellet in a tumbler, a Henschel mixer or a like apparatus. However, mixing may be omitted, if desired, and they are metered and fed separately to the kneading apparatus.

The kneaded resin composition can be molded by injection molding, extrusion molding, press molding, blow molding or various other molding methods. The present invention, however, includes methods in which the resin components are dry blended upon injection molding or extrusion molding and directly kneaded during melt-processing operation to obtain molded articles.

In the present invention, there is no particular limitation on the order of kneading. For example, the component(s) (a), (b) and (c) may be kneaded in a lump, or components (a) and (b) may be kneaded previously followed by kneading the rubbery substance (c). Other kneading orders may also be used.

EFFECT OF THE INVENTION

As described hereinabove, the thermoplastic resin compositions of the present invention exhibit excellent effects in that they have not only good moldability but also they can give rise to molded articles whose physical properties are well balanced.

Novel resin compositions provided by the present invention can be processed with ease by conventional molding methods employed for ordinary polyphenylene ether based thermoplastic resins, for example, injection molding, extrusion molding, press molding and blow molding, and provide products not only having well balanced physical properties such as impact strength, heat resistance and hardness but also having excellent homogeneity and smoothness in appearance.

In particular, it can be used as interior or exterior fitting materials for automobile parts such as a bumper, instrument panel, fender, trim, door panel, wheel cap, side protector, side seal garnish, trunklid, hood, quater panel, air intake, lower apron, spoiler, front grille, radiator grill, mirror housing, air cleaner, core material of a seat, glove box, console box, cooling fan, sirocco fan, brake oil tank, lamp housing, and roof.

It can also be used in machine parts which must be heat resistant. In addition, it can be used for bicycle parts such as covering material, muffler cover, leg shield, etc. Furthermore, the resin composition of the present invention can be used for electric and electronic parts which need to have high strength and heat resistance such as housing, chassis, connector, printed substrate, pulley, etc.

EXAMPLES

Hereinafter, the present invention will be explained in greater detail with reference to examples which should not be construed as limiting the present invention. Tests for the heat deflection temperature under load or the heat distortion temperature (H. D. T.) and the Izod impact strength (thickness: 3.2 mm) was performed according to JIS K7207 and JIS K7110, respectively.

The reduced viscosity ($\eta sp/C$) of the polyphenylene ether was determined in a solution of chloroform of 0.5 g/dl at 25° C.

For kneading the compositions, LABO PLASTOMILL produced by TOYO SEIKI CO., LTD (Kneading temperature: 270° C.) was used. The composition was press-molded to prepare test pieces, which were then determined for their physical properties.

EXAMPLES 1 TO 5 AND COMPARATIVE EXAMPLES 1 TO 3

Component (a), (b) and (c) used in these examples are undermentioned. These components were blended at proportions shown in Table 1 to obtain the resin compositions.

Component (a): Polyphenylene ether

Polyphenylene ether having a reduced viscosity of $\eta sp/C=0.58$ produced by NIPPON POLYETHER CO., LTD was used.

component (b): Modified propylene polymer

In a 10-liter autoclave were charged pellets (1 kg) of SIMITOMO NOBLEN D501 (trade name for a product by SUMITOMO CHEMICAL CO., LTD. MI=0.4) together with 4 liters of water, 190 g of styrene monomer, 4 g of a dispersing agent (METHOLOSE 90SH-100; trade name) and a peroxide (PERBUTYL PV; trade name), and the mixture was allowed to react at 120° C. for about 1 hour while blowing nitrogen gas in. After cooling, the reaction mixture was extracted with methyl ethyl ketone to remove polystyrene and thus the grafted propylene polymer was recovered.

The styrene-grafted product thus obtained is called "MG-1" for brevity.

Component (c): Rubbery substance which is compatible with the component (a).

This includes the following three species.

(i) SUMITOMO SBR 15Q7 (trade name for styrene-butadiene random copolymer rubber (SBR) produced by SUMITOMO CHEMICAL CO., LTD).

(ii) CARIFLEX TR1116 (trade name for styrene-butadiene-styrene block copolymer rubber (SBS) produced by SHELL CHEMICAL CO., LTD).

(iii) KRATON G1650 (trade name for styrene-ethylene-butylene-styrene block copolymer rubber (SEBS) produced by SHELL CHEMICAL CO., LTD). Component (c): Rubbery substance which is not compatible with the component (a).

This includes the following three species.

(i) SUMITOMO ESPREN E201 (trade name for ethylene-propylene rubber (EPR) produced by SUMITOMO CHEMICAL CO., LTD).

(ii) SUMITOMO ESPREN E400 (trade name for ethylene-propylene-diene rubber (EPDM) produced by SUMITOMO CHEMICAL CO., LTD).

(iii) Epoxy group-containing copolymer.

The epoxy group-containing copolymer was produced by the following method. That is, according to the method described in Unexamined Japanese Patent Publication Nos. 23490/1972 and 11888/1973, a terpolymer of ethylene-vinyl acetate-glycidyl methacrylate of 85:5:10 (% by weight) having a melt flow rate of 8 g/10 minutes (190° C., load:2.16 kg) was produced by high pressure radical polymerization method. Hereafter, the epoxy group-containing copolymer is called "E.GMA" for brevity. The respective components were blended at proportions shown in Table 1 and knead to obtain the resin compositions.

The resulting compositions were press-molded to form test pieces, which were then measured for their physical properties, and the results obtained are shown in Table 1.

It is noted from Table 1 that the resin composition of Examples 1 to 5 in which the polyphenylene ether (Component (a)) and the modified propylene polymer were blended with the rubbery substance compatible with the component (a) and the rubbery substance not compatible with the component (a) have much improved impact resistance as compared with the resin composition of Comparative Examples 1 in which only the rubbery substance not compatible with the component (a) was blended, the resin composition of Comparative Examples 2 in which only the rubbery substance compatible with the component (a) was blended, or the resin composition of Comparative Example 3 in which the rubbery substance was not blended.

EXAMPLES 6 TO 8 AND COMPARATIVE EXAMPLES 4

Components (a), (b) and (c) used in these examples are undermentioned. These components were blended at proportions shown in Table 2 to obtain the resin compositions.

Component (a): Polyphenylene ether

Polyphenylene ether having a reduced viscosity of $\eta sp/C=0.43$ produced by NIPPON POLYETHER CO., LTD was used.

Component (b): Propylene polymer

SUMITOMO NOBLEN AD571 (trade name for propylene-ethylene block copolymer having MI=0.6, produced by SUMITOMO CHEMICAL CO., LTD) was used.

Component (b): Modified propylene polymer

This includes the following two species.

(i) Pellets (1 kg) of the above-described SUMITOMO NOBLEN AD571 were charged in a 10 l autoclave together with 4 l of water, 40 g of styrene monomer, 52 g of methyl methacrylate, 2.8 g of a dispersing agent (METHOLOSE 90SH-100; trade name) and a peroxide (PERBUTYL PV; trade name), and the resulting mixture was allowed to react at 120° C. for one hour while blowing nitrogen gas in. After cooling, the reaction mixture was extracted with methyl ethyl ketone to remove polystyrene and thus modified propylene polymer composition grafted with styrene and methyl methacrylate was recovered. Hereinafter, the polymer composition thus obtained is called "MG-2" for brevity. (ii) A styrene and acrylonitrile-grafted polymer was prepared in the same manner as for MG-2, except that the graft monomers were replaced by 28 g of styrene and 11 g of acrylonitrile. Hereinafter, this polymer composition is referred to as "MG-3" for brevity.

Component (c): Rubbery substance which is compatible with the component (a)

This includes the following three species.

(i) SUMITOMO SBR 1507 (trade name for styrene-butadiene random copolymer rubber (SBR) produce by SUMITOMO CHEMICAL CO., LTD).

(ii) KRATON G1701X (trade name for styrene-ethylene-propylene copolymer rubber (SEP) produced by SHELL CHEMICAL CO., LTD).

(iii) Styrene-modified ethylene-propylene rubber.

The styrene modified ethylene-propylene rubber was produced by the following method.

In a stainless steel autoclave equipped with a stirrer were charged 1 kg of SUMITOMO ESPREN E201 (trade name for ethylene-propylene copolymer rubber (EPR) produced by SUMITOMO CHEMICAL CO., LTD; $ML_{1+4}$, 121° C.=27) in the form of chips, 3.5 kg of pure water, 40 g calcium tertiary phosphate and 40 g of PLURONIC F-68 (trade name for a product by ASAHI DENKA CO., LTD) and stirred with sufficient flow of nitrogen gas.

Thereafter, 43 parts by weight of styrene monomer and 7.5 g of SUNPEROX TO (trade name for a product by SANKEN KAKOU CO., LTD) as a free radical initiator were added to the resulting reaction mixture. After elevating the temperature to 110° C. in 80 minutes, the reaction is continued for 1 hour. After cooling, styrene-grafted copolymer rubber was taken out by filtration and the filtrate was washed sufficiently with pure water followed by drying under vacuum. Hereinafter, this modified ethylene-propylene rubber is called "RG-1" for brevity. Component (c): Rubbery substance which is not compatible with the component (a)

This include the following four species.

(i) DIENE R35A (trade name for polybutadiene (BR) produced by ASAHI CHEMICAL CO., LTD)

(ii) SUMITOMO ESPREN E-201 (trade name for ethylene-propylene rubber (EPR) produce by SUMITOMO CHEMICAL CO., LTD; ML$_{1+4}$, 121° C.=33).

(iii) SUMITOMO EXCELEN CN1001 (trade name for ethylene-α-olefin copolymer resin produced by SUMITOMO CHEMICAL CO., LTD; density=0.90 g/cm$^3$)

(iv) SUMITOMO ESPREN E512P (trade name for ethylene-propylene-diene rubber (EPDM) produced by SUMITOMO CHEMICAL CO., LTD; ML$_{1'4}$, 121° C.=68).

The respective components were blended at proportions shown in Table 2 and kneaded to obtain the resin compositions.

The resulting compositions were press-molded to form test pieces, which were then measured for their physical properties, and the results obtained are shown in Table 2.

It is noted from Table 2 that the resin compositions of examples 6 to 8 in which the mixture of the polyphenylene ether (component (a)), the modified propylene polymer and if desired, the propylene polymer (component (b)) were blended with the rubbery substance compatible with the component (a) and the rubbery substance not compatible with the component (a) exhibit much improved impact resistance than that of the resin composition of Comparative Example 4 in which the modified propylene polymer was absent.

TABLE 1

| Example No. (Comparative Example No.) | Resin Composition (Parts by weight) | | | | Physical Properties | | |
|---|---|---|---|---|---|---|---|
| | Component (a) Polyphenylene Ether | Component (b) Modified Propylene Polymer | Component (c) Rubbery Substance Compatible with Component (a) | Component (c) Rubbery Substance Not Compatible with Component (a) | Izod Impact Strength (Notched, kg · cm/cm) −30° C. | 23° C. | Heat Deflection Temperature under Load (4.6 kg/cm$^2$, °C.) |
| 1 | 38 | MG-1 42 | SBR *1 7 | EPR *2 13 | 7 | 14 | 117 |
| 2 | 38 | MG-1 42 | SBS *3 8 | EPDM *4 5 | 6 | 20 | 123 |
| 3 | 38 | MG-1 42 | SBS *3 8 | EPDM *4 12 | 11 | 19 | 114 |
| 4 | 38 | MG-1 42 | SEBS *5 5 | EPR *2 15 | 8 | 16 | 112 |
| 5 | 38 | MG-1 42 | SEBS *5 5 | EPR *2 15  E · GMA *6 5 | 9 | 18 | 113 |
| (1) | 38 | MG-1 42 | 0 | EPR *2 20 | 5 | 9 | 114 |
| (2) | 38 | MG-1 42 | SBS *3 20 | 0 | 4 | 8 | 109 |
| (3) | 38 | MG-1 42 | 0 | 0 | 1 | 3 | 128 |

Note to Table 1
*1 SUMITOMO SBR 1507 (trade name. SUMITOMO CHEMICAL CO., LTD.)
*2 SUMITOMO ESPREN E201 (trade name, SUMITOMO CHEMICAL CO., LTD.)
*3 CARIFLEX TR1116 (trade name. SHELL CHEMICAL CO., LTD.)
*4 SUMITOMO ESPREN E400 (trade name. SUMITOMO CHEMICAL CO., LTD.)
*5 KRATON G1650 (trade name. SHELL CHEMICAL CO., LTD.)
*6 Copolymer containing epoxy group

TABLE 2

| Example No. (Comparative Example No.) | Resin composition (Parts by weight) | | | | | Physical Properties | | |
|---|---|---|---|---|---|---|---|---|
| | Component (a) Polyphenylene Ether | Component (b) Modified Propylene Polymer | Propylene Polymer *1 | Component (c) Rubbery Substance Compatible with Component (a) | Component (c) Rubbery Substance Not Compatible with Component (a) | Izod Impact Strength (Notched, kg · cm/cm) −30° C. | 23° C. | Heat Deflection Temperature under Load (4.6 kg/cm$^2$, °C.) |
| 6 | 40 | MG-2 43 | 0 | SBR *2 8 | EPR *3 9 | 9 | 16 | 126 |
| 7 | 40 | MG-3 43 | 0 | SBR *2 5 | EPR *3 9 | 8 | 18 | 128 |
| 8 | 40 | MG-3 43 | 0 | RG-1 4  SBR *2 4 | CN1001 *7 5  EPDM *4 4 | 13 | 27 | 125 |
| (4) | 40 | 0 | 43 | SEP *5 | BR *6 | 7 | 13 | 97 |

TABLE 2-continued

| Example No. (Comparative Example No.) | Resin composition (Parts by weight) | | | Physical Properties | | |
|---|---|---|---|---|---|---|
| | Component (a) Polyphenylene Ether | Component (b) | | Component (c) | Izod Impact Strength (Notched, kg · cm/cm) | Heat Deflection Temperature under Load (4.6 kg/cm², °C.) |
| | | Modified Propylene Polymer | Propylene Polymer *1 | Rubbery Substance Compatible with Component (a) | Rubbery Substance Not Compatible with Component (a) | −30° C. | 23° C. | |
| | | | | 11 | 6 | | | |

Note to Table 2
*1 SUMITOMO NOBLEN AD571 (trade name, SUMITOMO CHEMICAL CO., LTD.)
*2 SUMITOMO SBR 1507 (trade name, SUMITOMO CHEMICAL CO., LTD.)
*3 SUMITOMO ESPREN E201 (trade name, SUMITOMO CHEMICAL CO., LTD.)
*4 SUMITOMO ESPREN E512P (trade name, SUMITOMO CHEMICAL CO., LTD.)
*5 KRATON G1701X (Trade name, SHELL CHEMICAL CO., LTD.)
*6 DIENE R35A (trade name, ASAHI CHEMICAL CO., LTD.)
*7 SUMITOMO EXCELLEN CN1001 (trade name, SUMITOMO CHEMICAL CO., LTD.)

What is claimed is:

1. A thermoplastic resin composition, comprising:
   (a) a polyphenylene ether resin or a resin composition containing a polyphenylene ether,
   (b) (i) a modified propylene polymer obtained by grafting a propylene polymer with a styrene-based monomer or a mixture of a styrene-based monomer and a monomer copolymerizable with the styrene-based monomer or (ii) a composition containing said modified propylene polymer and a propylene polymer, and
   (c) two or more rubbery substances, at least one rubbery substance being compatible with the component (a), and at least one rubbery substance being not compatible with the component (a).

2. A thermoplastic resin composition as claimed in claim 1, wherein the proportion of the component (a) to the sum of the components (a) and (b) is 1 to 90% by weight, the proportion of the component (b) to the sum of the components (a) and (b) is 99 to 10% by weight, and the proportion of the component (c) to the sum of the components (a) and (b) is 1 to 50 parts by weight per 100 parts by weight of (a) plus (b).

3. A thermoplastic resin composition as claimed in claim 1, wherein said rubbery substances are composed of a rubbery substance which is compatible with the component (a) and have at least one alkenyl aromatic chain in the same molecule, and a rubbery substance which is not compatible with the component (a) and does not have alkenyl aromatic chain in the same molecule.

4. A thermoplastic resin composition as claimed in claim 1, wherein said, polyphenylene ether (a) is a polyphenylene ether obtained by oxidative polymerization of at least one phenol compound represented by the general formula (1)

$$\begin{array}{c} OH \\ R_1 \diagup \diagdown R_5 \\ R_2 \diagdown \diagup R_4 \\ R_3 \end{array} \quad (1)$$

wherein $R_1$, $R_2$, $R_3$, $R_4$ and $R_5$, each independently represents a hydrogen atom, a halogen atom, a hydrocarbon group or a substituted hydrocarbon group, or a hydrocarbyloxy group or a substituted hydrocarbyloxy group, provided that at least one of $R_1$, $R_2$, $R_3$, $R_4$ and $R_5$ is a hydrogen atom.

5. A thermoplastic resin composition as claimed in claim I, wherein said monomer copolymerizable with the styrene-based monomer in the component (b) is at least one monomer selected from the group consisting of maleic anhydride, methyl methacrylate, glycidyl acrylate, glycidyl methacrylate, 2-aminoethyl methacrylate, and 2-hydroxyethyl methacrylate.

6. A thermoplastic resin composition as claimed in claim 1, wherein said propylene polymer in the component (b) is a highly crystalline polypropylene which has an isotactic pentad fraction of 0.970 or higher, defined as an isotactic pentad fraction in a boiling heptane-insoluble portion of the propylene polymer.

7. A thermoplastic resin composition as claimed in claim 1, wherein said propylene polymer in the component (b) is a highly crystalline polypropylene which has an isotactic pentad fraction of 0.970 or higher, defined as an isotactic pentad fraction in a boiling heptane-insoluble portion of the propylene polymer, and a content of boiling heptane-soluble portion being not higher than 5.0% by weight and a content of a 20° C. xylene-soluble portion being not higher than 2.0% by weight.

8. A thermoplastic resin composition as claimed in claim 1, wherein said propylene polymer in the component (b) is obtained by blending a propylene polymer with a vinyloycloalkane polymer having 6 or more carbon atoms and contains 0.05 to 10000 ppm by weight of vinylcycloalkane units.

9. A thermoplastic resin composition as claimed in claim 3, wherein said rubbery substance compatible with the component (a) and having at least one alkenyl aromatic chain in the same molecule is at least one rubber selected from the group consisting of styrene-butadiene copolymer, styrene-butadiene-styrene copolymer, styrene-ethylene-butylene-styrene copolymer, styrene-isoprene copolymer and styrene-ethylene-propylene copolymer.

10. A thermoplastic resin composition as claimed in claim 3, wherein said rubbery substance not compatible with the component (a) and not having alkenyl aromatic chain in the same molecule is an ethylene-α-olefin copolymer rubber or a modified product thereof.

11. A thermoplastic resin composition as claimed in claim 10, wherein said ethylene-α-olefin copolymer rubber is an ethylene-α-olefin copolymer rubber which has an ethylene content of 15 to 85% by weight, a Mooney viscosity ($ML_{1+4}$, 121° C.) of 5 to 120, and a glass transient point of not higher than −10° C.

12. Molded articles which are made of the thermoplastic resin composition claimed in claim 1.

13. Automotive parts which are made of the thermoplastic resin composition claimed in claim 1.

14. Automotive parts as claimed in claim 10 which is selected from the group consisting of a bumper, instrument panel, fender, trim, door panel, wheel cap, side protector, side seal garnish, trunk lid, hood, quarter panel, air intake, lower apron, spoiler, front grille, radiator grille, mirror housing, air cleaner, core material of a seat, glove box, console box, cooling fan, sirocco fan, brake oil tank, lamp housing and roof.

* * * * *